(12) United States Patent  
Huang

(10) Patent No.: US 8,872,012 B2
(45) Date of Patent: Oct. 28, 2014

(54) MUSIC PRE-END-PLAY PROCESSING METHOD USING TIME DATA AND ELECTRONIC APPARATUS FOR IMPLEMENTING THE SAME

(75) Inventor: Hung-Chi Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 144 days.

(21) Appl. No.: 12/632,903

(22) Filed: Dec. 8, 2009

(65) Prior Publication Data

US 2010/0272244 A1 Oct. 28, 2010

(30) Foreign Application Priority Data

Apr. 27, 2009 (TW) ............................... 98113942 A

(51) Int. Cl.
 *G10H 1/36* (2006.01)
 *H04M 3/00* (2006.01)
 *H04M 3/42* (2006.01)
 *H04M 1/725* (2006.01)

(52) U.S. Cl.
 CPC ...... *H04M 3/42017* (2013.01); *H04M 2201/14* (2013.01); *H04M 1/72558* (2013.01)
 USPC .................. 84/600; 84/615; 84/634; 379/418

(58) Field of Classification Search
 USPC .......................................................... 84/600
 See application file for complete search history.

(56) References Cited

U.S. PATENT DOCUMENTS

| 4,348,929 | A  | * | 9/1982  | Gallitzendorfer ............... 84/607 |
| 5,198,603 | A  | * | 3/1993  | Nishikawa et al. ............. 84/601 |
| 5,386,081 | A  | * | 1/1995  | Nakada et al. .................. 84/609 |
| 6,933,432 | B2 | * | 8/2005  | Shteyn et al. ................... 84/609 |
| 7,277,361 | B1 | * | 10/2007 | Baba et al. ..................... 368/109 |
| 2008/0092721 | A1 | * | 4/2008 | Schnepel et al. ................ 84/609 |
| 2008/0167993 | A1 | * | 7/2008 | Cue et al. ........................ 705/51 |

FOREIGN PATENT DOCUMENTS

| CN | 1997052    | 7/2007 |
| CN | 101345790  | 1/2009 |
| WO | 2008101126 | 8/2008 |

OTHER PUBLICATIONS

China OA issued on Aug. 8, 2011.

* cited by examiner

*Primary Examiner* — Christopher Uhlir
(74) *Attorney, Agent, or Firm* — WPAT, PC; Justin King

(57) ABSTRACT

A music data processing method applied to an electronic apparatus includes obtaining a time data; retrieving a partial music data from an input music data according to the time data; and performing a pre-end-play processing on the partial music data to output an output music data. With the pre-end-play processing performed, the output music data is substantially different from the partial music data.

7 Claims, 3 Drawing Sheets

MUSIC PRE-END-PLAY PROCESSING METHOD USING TIME DATA AND ELECTRONIC APPARATUS FOR IMPLEMENTING THE SAME

CROSS REFERENCE TO RELATED PATENT APPLICATION

This patent application is based on Taiwan, R.O.C. patent application No. 098113942 filed on Apr. 27, 2009.

FIELD OF THE INVENTION

The present invention relates to a music data processing method and an electronic apparatus using the music data processing method.

BACKGROUND OF THE INVENTION

Nowadays, more and more mobile phone providers offer various types of music or songs for ring-back tones and services that allow users to select their favorite music or songs for ring-back tones. In addition, music files, such as songs in an MP3 format, stored in a mobile phone, may serve as a ring-back tone of the mobile phone.

Although the ring-back tone and a music tone in general sound rather pleasant, the mobile will stop the ring-back tone after a predetermined time if the call is not answered. However, since the ring-back tone or the music tone does not always stop exactly when the song ends, the suddenly stop will interrupt the music flow, and the process of the music data is left uncompleted.

Consequently, a music data processing method and an electronic apparatus using the music data processing method are provided according to the present invention, so as to overcome the disadvantage of the prior art.

SUMMARY OF THE INVENTION

A music data processing method and an electronic apparatus using the method are provided according to an embodiment of the present invention. A pre-end-play processing is performed before the music comes to an end such that a user does not feel that the music is suddenly interrupted when the music comes to an end.

According to an embodiment of the present invention, a music data processing method applied to an electronic apparatus is provided. The method comprises obtaining a time data for an input music data, wherein the input music data comprises a first part data and a second part data by dividing the input music data with the time data; retrieving the first part data from the input music data; and performing a pre-end-play processing on the first part data to generate an output music data, wherein the output music data is different from the first part data.

According to another embodiment of the present invention, an electronic apparatus is provided. The electronic apparatus comprises a music analysis module and a music generating module. The music analysis module retrieves a first part data from an input music data according to a time data, wherein the input music data comprises the first part data and a second part data by dividing the input music data with the time data. The music generating module performs a pre-end-play processing on the first part data to generate an output music data, wherein the output music data is different from the first part data.

According to another embodiment of the present invention, a music playing method applied to an electronic apparatus is provided. The music playing method comprises playing an input music data; retrieving a part data from the input music data in response to a trigger signal; performing a pre-end-play processing on the part data to generate an output music data, wherein the output music data is different from the part data; and switching to play the output music data.

The advantages and spirit related to the present invention can be further understood via the following detailed description and drawings.

DETAILED DESCRIPTION OF THE PREFERRED EMBODIMENT

According to embodiments of the present invention, a music data processing method and an electronic apparatus using the method are provided. In the music data processing method, a pre-end-play processing is performed on an input music data such as a ring-back tone of a mobile phone. When the music data comes to the end, an auditor may feel that the ring or music still sounds pleasant instead of feeling that the ring or music is suddenly interrupted.

Figure 1:
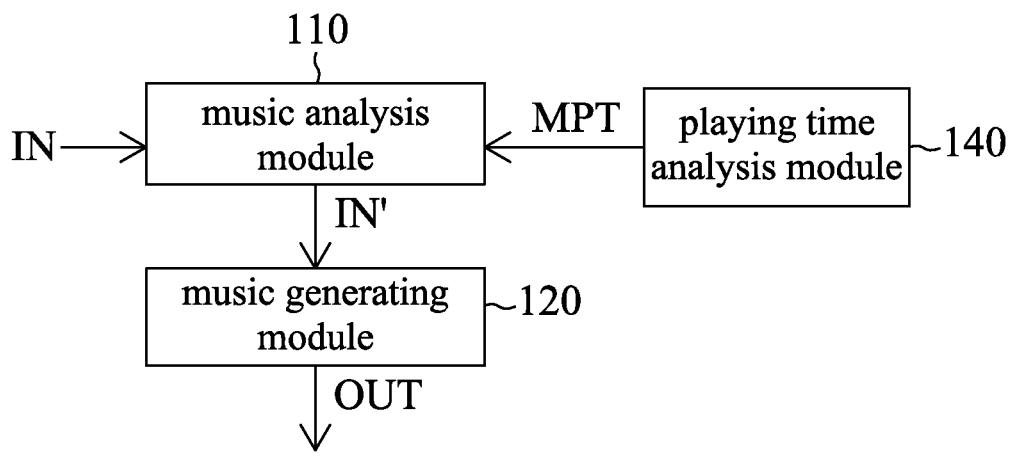
FIG. 1 is a functional block diagram of an electronic apparatus 100 in accordance with a first embodiment of the present invention.

FIG. 1 is a functional block diagram of an electronic apparatus 100 in accordance with a first embodiment of the present invention. The electronic apparatus 100 comprises a music analysis module 110, a music generating module 120 and a playing time analysis module 140.

The playing time analysis module 140 outputs a music playing time data MPT to the music analysis module 110. The music analysis module 110 retrieves a partial music data IN' from an input output data IN according to the music playing time data MPT.

The music generating module 120 performs a pre-end-play processing on the partial music data IN' to generate an output music data OUT. After the pre-end-play processing is performed, the output music data is substantially different form the partial music data IN'.

In this embodiment, the pre-end-play processing performed by the music generating module 120 is at least one of a volume attenuation processing and a music repetition processing for example, or a combination of the two; however, the examples shall not construed as limiting the invention.

The volume attenuation processing gradually attenuates the volume of the music to mute. In addition, during the volume attenuation processing, the attenuation curve can be a linear curve or a nonlinear curve.

The music repetition processing is to repeat music notes, of a certain time point or a certain interval, of the partial music data IN', until the music comes to the end.

Take a mobile phone as an example of the electronic apparatus 100 and a ring-back tone as an example of the input music data to gain a better understanding of the first embodiment of the present invention; however, the examples shall not construed as limiting the invention. The electronic apparatus 100 performs a pre-end-play processing on the ring-back tone currently applied by a user to generate a new ring-back tone for replacing the original ring-back tone. When the call is not answered or is declined, the new ring-back tone does not bring the caller a disagreeable feeling that the music is suddenly interrupted.

For example, the input music data IN is the ring-back tone in an MP3 format currently applied by the user; however, it shall not construed as limiting. The music analysis module 110 analyzes the input music data IN to obtain music properties comprising at least, e.g., music notes and volume, of each time point. In the following description, suppose that the ring-back tone currently applied by the user has a length of 15 seconds. After analyzing the ring-back tone, the music analysis module 110 obtains music notes and the volume corresponding to the 10th second of the ring-back tone. In this embodiment, the partial music data IN' is a certain part of the ring-back tone, and is generally the end of the ring-back tone.

The music playing time data MPT represents a total playing time of the ring-back tone. In the first embodiment of the present invention, various methods for obtaining the music playing time data MPT are discussed below.

A playing time analysis module 140 is used for obtaining the music playing time data MPT according to the playing time limit of the electronic apparatus 100. That is, the playing time analysis module 140 analyzes the capability of playing time of the electronic apparatus 100 for playing the ring-back tone to obtain the music playing time data MPT. For example, when the playing time of the electronic apparatus 100 for playing the ring-back tone is to be analyzed, the playing time analysis module 140 informs the user to call one's mobile phone, and detects and determines a total playing time length of the ring-back tone during one call. For example, the total playing time length is regarded as a duration from when the ring-back tone starts to mute.

A user-defined playing time of the ring-back tone may also be regarded as the music playing time data MPT. That is, a predetermined user-defined total playing time length of the ring-back tone is provided by the user to the music analysis module 110.

After the music playing time data MPT is obtained, the music analysis module 110 determines the partial music data IN' to be retrieved according to the music playing time data MPT. For example, a timer begins to time upon playing the music, and the music analysis module 110 outputs a music data of 3 seconds prior to the end point to the music generating module 120 when the music gets close to the end point, e.g., 3 seconds prior to the end point. The end point is determined according to the music playing time data MPT.

Next, how to generate a new ring-back tone by the electronic apparatus according to the first embodiment of the present invention is to be discussed below. The new ring-back tone is substantially different from the original ring-back tone.

In Situation 1, the volume of an original ring-back tone is attenuated to obtain a new ring-back tone. When the volume of the original ring-back tone is attenuated, the music analysis module 110 transmits the partial music data IN', e.g., a music data between the 12th second to the 15th second of the original ring-back tone, to the music generating module 120. Accordingly, the music generating module 120 attenuates the volume of the partial music data IN' to generate the new ring-back tone. For example, the music is eventually attenuated to mute; however, the attenuation degree is not limited by the example. Provided that a human is sensible to the attenuation, any degree of attenuation is encompassed within the spirit and scope of the present invention. Supposing now the new ring-back tone has a playing time of 15 seconds, music notes and the volume of the first 12 seconds of the new ring-back tone are basically the same with those of the first 12 seconds of the original ring-back tone. However, the volume of the last 3 seconds of the new ring-back tone is lower than that of the last 3 seconds of the original ring-back tone, and music notes of the last 3 seconds of the new ring-back tone may be the same as those of the last 3 seconds of the original ring-back tone. Accordingly, since the volume of the last 3 seconds of the new ring-back tone heard by the user is gradually attenuated or eventually muted, the caller immediately learns that the call is not answered without feeling that the ring-back tone suddenly ends.

In Situation 2, a music note of the original ring-back tone is repeated while a playing time is not increased. The music analysis module 110 transmits the partial music data IN', e.g., the music at the 12th second of the ring-back tone, of which the music note is to be repeated, to the music generating module 120. Accordingly, the music generating module 120 repeats the music note of the partial music data IN' to generate a new ring-back tone. A length of the repetition duration is not limited, and various lengths of the repetition duration are encompassed within the spirit and scope of the present invention provided that a human is sensible to the repetition of the music note. For example, the 12th second of the ring-back tone has a music note "Do", and notes from the 12th second to the 15th second of the new ring-back tone are "Do" from repeating the music note at the 12th second of the ring-back tone. Therefore, when the new ring-back tone heard by the caller ends with a same music note, the caller immediately learns that the call is not answered without feeling that the ring-back tone suddenly ends. More particularly, the new ring-back tone still has a playing time of 15 seconds. Content of the first 12 seconds of the new ring-back tone is basically the same as that of the first 12 seconds of the original ring-back tone, and the last 3 seconds of the new ring-back tone are repetitions of the music note of the 12th second. Accordingly, upon hearing the last 3 seconds of the new ring-back tone as repetitions of a music note, the caller immediately learns that the call is not answered without feeling that the ring-back tone suddenly ends.

In Situation 3, a music note of the original ring-back tone is repeated in addition to increasing a playing time, so that the playing time of a new ring-back tone is longer than that of the original ring-back tone. When a pre-end-play processing is performed under this condition, the music analysis module 110 transmits the partial music data IN' to the music generating module 120. Generally, the partial music data IN' is the last second (i.e. the 15th second) of the original ring-back tone. Accordingly, the music generating module 120 repeats a music note of the partial music data IN' to generate a new ring-back tone. A length of the repetition duration is not limited, and various lengths of the repetition duration are encompassed within the spirit and scope of the present invention provided that a human is sensible to the repetition of the music note. Moreover, the playing time of the new ring-back tone is longer than that of the original ring-back tone. For example, after the original ring-back tone having 15 seconds and a music note "Do" of the 15th second is processed by the music generating module 120, the playing time of the new ring-back tone is increased to, e.g., 18 seconds. Music notes of the first 15 seconds of the new ring-back tone are basically the same as those of the original ring-back tone, and music notes from the 16th second to the 18th second are repetitions of the music note "Do". Therefore, upon hearing that the end of the new ring-back tone stays at a same music note, the caller can learn that the call is not answered without feeling that the ring-back tone suddenly ends.

The pre-end-play processing performed by the music generating module 120 is not limited to the foregoing description. Moreover, the pre-end-play processing may be a combination of the volume attenuation processing and the music note repetition processing. That is, compared to the original ring-back tone, music notes of the 12th second to the 15th second of the new ring-back tone are "Do", and the volume of which is attenuated gradually as well.

Suppose the music analysis module 110 and the music generating module 120 are applied inside the electronic apparatus as an application program (i.e. software) stored in a memory in the electronic apparatus 100, the music analysis module 110 and the music generating module 120 need not be performed by a processor in the electronic apparatus 100 when not in use. That is, the music analysis module 110 and the music generating module 120 are only called out when a user wishes to perform a pre-end-play processing on the original ring-back tone.

Figure 2:
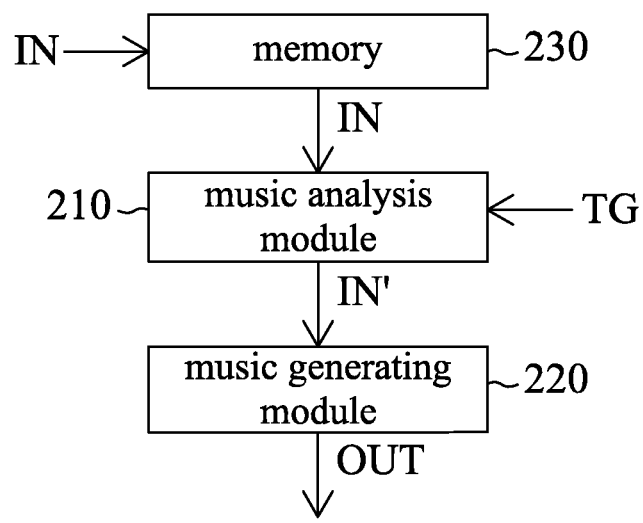
FIG. 2 is a functional block diagram of an electronic apparatus 200 in accordance with a second embodiment of the present invention.

FIG. 2 shows a block diagram of an electronic apparatus 200 in accordance with a second embodiment of the present invention. The electronic apparatus 200 comprises a music analysis module 210, a music generating module 220 and a memory 230. The functions of the music analysis module 210 and the music generating module 220 of the second embodiment are the same as or similar to those of the first embodiment, and details thereof shall not be described for brevity.

The memory 230 temporarily stores and outputs an input music data IN to the music analysis module 210. The music analysis module 210 triggered by a trigger signal TG retrieves a partial music data IN' from the input music data IN transmitted from the memory 230.

An operation of the electronic apparatus 200 according to the second embodiment of the present invention is described below. In order to gain a better understanding of the second embodiment of the present invention, the electronic apparatus is a mobile phone and the input music data is a ring-back tone for example; however, the example is not construed as limiting the invention.

According to the second embodiment of the present invention, when the electronic apparatus 200 plays the input music data IN (the ring-back tone in this embodiment), the input music data IN is partly or totally stored in the memory 230. In response to a generated trigger signal TG, the music analysis module 210 is triggered to access the input music data IN and retrieve a partial music data IN' from the memory 230. The music generating module 220 then performs a pre-end-play processing on the partial music data IN' to generate and play a new ring-back tone. The method for generating the new-ring-back tone is as described in the first embodiment, and shall not be again given for brevity.

In the second embodiment, the trigger signal TG indicates that the ring-back tone is to be stopped shortly, and it can be generated by various approaches, of which several examples are to be discussed; however, the examples shall not be construed as limiting the invention. Provided that the electronic apparatus 200 automatically or passively generates the trigger signal TG when playing music files, modifications to the various approaches are included within the spirit and scope of the present invention.

One of the approaches for generating the trigger signal TG is triggered by a user; that is, when the user does not wish to or is unable to answer an incoming call, the user can push a "decline call" button of a mobile phone. In response to the manipulation of the user, a trigger signal TG is transmitted to the music analysis module 210.

According to another approach for generating the trigger signal TG, an electronic apparatus in accordance with the second embodiment of the present invention further comprises a timer (not shown in FIG. 2). The timer may be built inside a playing time analysis module (not shown in FIG. 2) or an independent module. The timer is used for timing the playing time of a ring-back tone. When an incoming call is received and the playing time of the ring-back tone is longer than a predetermined time such as 12 seconds, the timer directly or indirectly transmits a trigger signal TG to the music analysis module 210, so as to trigger the music analysis module 210.

It is to be noted that, in the second embodiment, before the trigger signal TG is generated, the electronic apparatus 200 plays an original ring-back tone. Only after the trigger signal TG is generated and a pre-end-play processing is performed, and the electronic apparatus 200 plays an output music data outputted by the music generating module 220.

Figure 3:
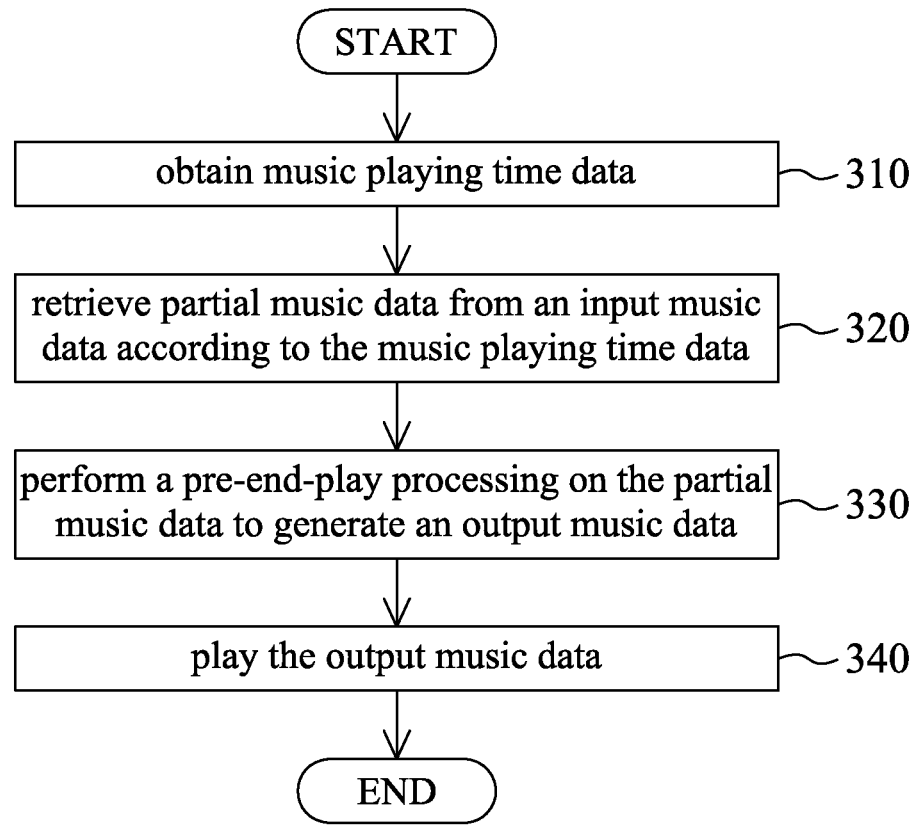
FIG. 3 is a flow chart of a music data processing method in accordance with another embodiment of the present invention.

FIG. 3 is a flowchart of a music data processing method in accordance with another embodiment of the present invention. The music data processing method is applied to an electronic apparatus according to the foregoing embodiments of the present invention. The music data processing method comprises steps below. In Step 310, a music playing time data is obtained. In Step 320, a partial music data is retrieved from an input music data according to the music playing time data. In Step 330, a pre-end-play processing is performed on the partial music data to generate an output music data. In Step 340, the output music data is played. After the pre-end-play processing is performed, the output music data is substantially different from the partial music data.

Detailed description of Step 310 to Step 340 can be deduced from the foregoing embodiments of the present invention, and it will not be described for brevity.

Figure 4:
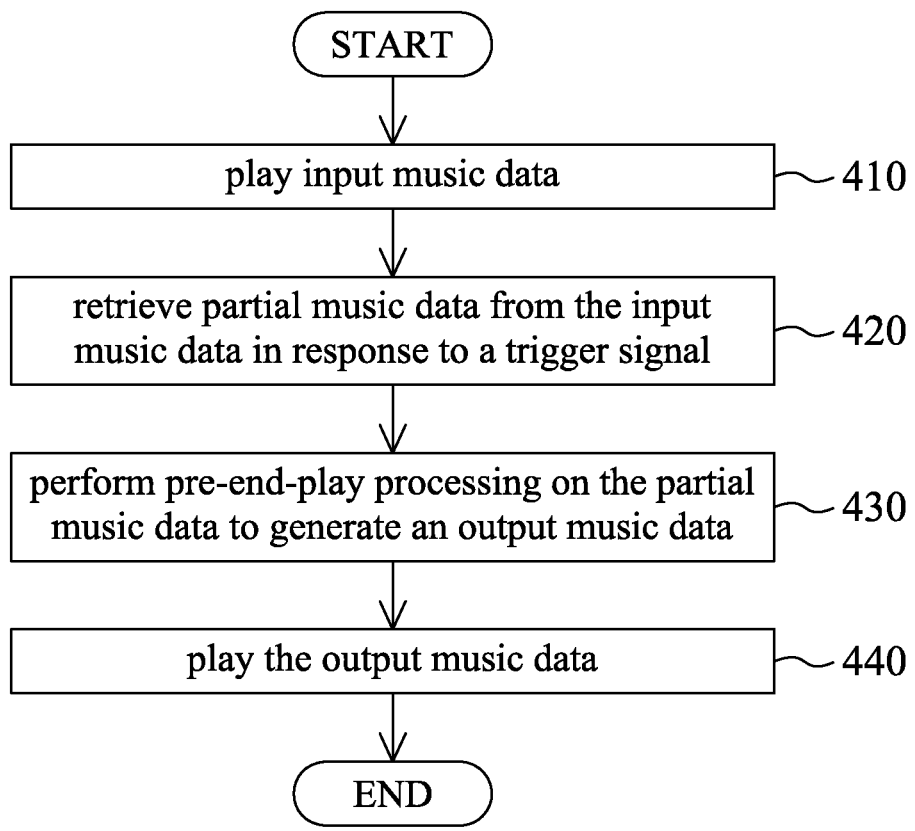
FIG. 4 is a flow chart of a music data processing method in accordance with another embodiment of the present invention.

FIG. 4 shows a flowchart of a music data processing method in accordance with another embodiment of the present invention. The music data processing method is applied to an electronic apparatus according to the foregoing embodiments of the present invention. The music data processing method comprises steps below. In Step 410, an input music data is played. In Step 420, a partial music data is retrieved from the input music data in response to a trigger signal. In Step 430, a pre-end-play processing is performed on the partial music data to generate an output music data such that the output music data is substantially different from the partial music data. In Step 440, the output music data is played.

Detailed description of Step 410 to Step 440 can be deduced from the foregoing embodiments of the present invention, and it will not be described for brevity.

The electronic apparatuses according to the foregoing embodiments of the present invention are not limited to mobile phones; any electronic apparatus capable of playing a digital music data to a caller or user is within the scope of the present invention. For example, the electronic apparatus is a mobile phone, a personal digital assistant (PDA), or a digital electronic device (e.g., a digital clock and a digital frame) that is capable of playing a digital music data regarded as a clock. When the embodiments of the present invention are applied to the digital clock or the digital photo frame, a trigger signal is generated from the user manipulating buttons. For example, a trigger signal is generated by a user turning off the clock.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A music data processing method, applied to a mobile phone device for outputting a ring tone having a predetermined ring tone duration, comprising:
    determining a total play time of said mobile phone device's ring-back tone;
    setting said predetermined ring tone duration equal to said total playtime;
    dividing an input music data into a first part data and a second part data, wherein said first part data has a duration equal to said predetermined ring tone duration;
    retrieving the first part data from the input music data;
    performing a pre-end-play processing on the first part data to generate an output music data, wherein the output music data is directly derived from the first part data and is distinctly different from the first part data; and
    rendering said output music data by the mobile phone device as said ring tone;
    wherein said mobile phone device autonomously performs said music data processing method.

2. The music data processing method as claimed in claim 1, wherein the step of performing the pre-end-play processing comprises:
    performing a volume attenuation processing on the first part data.

3. The music data processing method as claimed in claim 1, wherein the step of performing the pre-end-play processing comprises:
    performing a music repetition processing on the first part data.

4. A mobile phone device for outputting a ring tone having a predetermined ring tone duration by performing a music data processing method, comprising:
    a playing time analysis module, for determining a predetermined ring tone duration by determining a total play time of said mobile phone device's ring-back tone and setting said predetermined ring tone duration equal to said total play time;
    a music analysis module, for dividing an input music data into a first part data and a second part data and retrieving the first part data from the input music data, wherein said first part data has a duration equal to said predetermined ring tone duration;
    a music generating module, for performing a pre-end-play processing on the first part data to generate an output music data, wherein the output music data is directly derived from the first part data and is distinctly different from the first part data; and
    rendering said output music data by the mobile phone device as said ring tone;
    wherein said mobile phone device autonomously performs said music data processing method.

5. The mobile phone device as claimed in claim 4, wherein the music generating module performs a volume attenuation processing on the first part data.

6. The mobile phone device as claimed in claim 4, wherein music generating module performs a music repetition processing on the first part data.

7. The mobile phone device as claimed in claim 4, further comprising:
    a memory, for storing the input music data; wherein the music analysis module retrieves the first part data from the memory according to a user-triggered signal.

* * * * *